United States Patent [19]

Malek

[11] Patent Number: 4,903,157
[45] Date of Patent: Feb. 20, 1990

[54] ELECTROMAGNET-ACTUATED HEAD LATCHING APPARATUS

[75] Inventor: Stefan J. Malek, Boulder, Colo.

[73] Assignee: MiniScribe Corporation, Longmont, Colo.

[21] Appl. No.: 175,489

[22] Filed: Mar. 30, 1988

[51] Int. Cl.⁴ .......................... G11B 5/54; G11B 21/12
[52] U.S. Cl. ........................................ 360/105; 360/75
[58] Field of Search ................................. 360/75, 105

[56] References Cited

U.S. PATENT DOCUMENTS

| | | | |
|---|---|---|---|
| 4,110,802 | 8/1978 | Ho et al. | 360/106 |
| 4,139,874 | 2/1979 | Shiraishi | 360/86 |
| 4,484,241 | 11/1984 | Brende et al. | 360/105 |
| 4,562,500 | 12/1985 | Bygdnes | 360/105 |
| 4,594,627 | 6/1986 | Viskochil et al. | 360/105 |
| 4,654,735 | 3/1987 | Izraelev et al. | 360/104 |
| 4,658,308 | 4/1987 | Sander, Jr. | 360/75 X |
| 4,686,595 | 8/1987 | Bryer | 360/105 X |
| 4,706,142 | 11/1987 | Hattori et al. | 360/105 |
| 4,725,907 | 2/1988 | Jue | 360/105 |
| 4,734,804 | 3/1988 | Hanabusa | 360/105 X |
| 4,751,595 | 6/1988 | Kishi et al. | 360/75 X |
| 4,786,995 | 11/1988 | Stupeck et al. | 360/75 |
| 4,796,130 | 1/1989 | Shimanuki | 360/105 |
| 4,807,071 | 2/1989 | Kosaka et al. | 360/105 |
| 4,807,072 | 2/1989 | Ono et al. | 360/105 |

Primary Examiner—Robert L. Richardson
Assistant Examiner—David L. Robertson
Attorney, Agent, or Firm—Curtis, Morris & Safford

[57] ABSTRACT

A head retracting/latching apparatus for a hard or floppy disc drive includes a prong which is held during power-on conditions by an electromagnet at an unlatched position out of contact with the head assembly. When power is interrupted, the head assembly is energized to move the heads to a retracted "home" position. The prong is released by the electromagnet and moves by spring force towards a latched position contacting the head assembly to prevent its movement as long as power remains off.

15 Claims, 3 Drawing Sheets

ELECTROMAGNET-ACTUATED HEAD LATCHING APPARATUS

FIELD OF THE INVENTION

The present invention relates to apparatus for holding the head assembly of a disc drive device at a retracted position during off-power conditions so as to avoid damage to either the head or the disc itself.

BACKGROUND OF THE INVENTION

Disc drive devices have become readily accepted as computer peripheral devices for long term storage of large quantities of data. Such devices typically are constructed either as rigid disc drives, also known as hard or Winchester disc drives, or "floppy" disc drives. Hard disc drive devices offer storage capacities that are several orders of magnitude greater than floppy disc drive devices and typically contain one, two or more hard discs that generally are permanently installed. Floppy disc drive devices, on the other hand, allow the user to load and unload the floppy disc, thus enabling the user to store different types of information on different discs, as needed. Although the present invention is available for use in floppy disc drive systems, it is primarily intended for use in hard disc drive devices in which the head for reading a disc rests against the disc during off-power conditions.

In such hard disc drive devices, when the power is on and the disc is rotating, the head (or heads, as typically plural surfaces of plural discs are used for the writing and reading of data) "flies" over the surface of the disc with the rotation of the disc creating an air bearing on which the head is carried. If this air bearing is reduced, as when the rotating disc slows, the head may crash to the surface of the disc, thus resulting in damage to the disc and to the head and, moreover, resulting in significant loss of recorded information due to the crash. To avoid significant changes in rotary speed of the disc, the disc drive spindle motor which rotatably drives the disc is controlled to detect and account for speed variations.

Notwithstanding desired spindle motor speed controls, additional precautions must be taken when the disc drive is deenergized to avoid the destruction of recorded data. Conventionally, hard discs are provided with an information free zone in which no data is recorded and upon which the head is intended to rest during power-off conditions. Therefore, when the usual power switch is opened to deenergize the disc drive, circuitry might be triggered, as under microprocessor control, to retract the head to the information-free zone before power is actually interrupted. That is, the usual head positioning apparatus, such as a stepper motor or a voice coil drive motor, both of which are referred to generically as the head actuator, is controlled to move the heads to a "home" or "park" position, i.e. any position within the zone that is safely away from the usable surface of the disc. If the head is moved in time to this retracted home position, there is no danger of it destroying useful data when it lands on the surface of the disc after the termination of rotation following power interruption. Advantageous apparatus for retracting the head and braking the spindle motor in such a disc drive device is disclosed in U.S. Pat. No. 4,658,308 (Sander, Jr.), assigned in common with the present invention. This apparatus uses the emf that is generated by the disc drive spindle motor as a result of the rotation of that motor following a power interruption to retract the head to the home position.

Once the head has been retracted to the information-free zone and has come to rest thereon, the head thereafter should be held at its retracted position while the power remains off. Otherwise jostling or shaking of the device, for example while the device is being moved from one location to another, could cause the head to move away from the zone into an area of the disc on which information is recorded and, since the disc is not then rotating and the head is not "flying," information could be destroyed and both the head and disc damaged. A variety of mechanical/electrical structures have been proposed for moving the head assembly of a disc drive to its retracted position and holding it there during power off times. In such structures, the mechanism for holding the head assembly should be as simple and yet as foolproof as possible. It also should be small and lightweight, an advantageous feature in disc drives considering the move towards miniaturization. To this end, large and powerful springs are bulky and heavy and should be avoided if possible. The mechanism should also be foolproof since, particularly in a hard disc drive, the discs are permanently encapsulated within the apparatus and damage to either a disc or a head can require significant repair or replacement.

OBJECTS AND SUMMARY OF THE INVENTION

Therefore, it is an object of the present invention to provide an improved apparatus for retracting the head in a disc drive device to an information-free zone and latching it there which avoids the above-described difficulties of the prior art.

It is another object of the present invention to provide an apparatus for latching the head in a disc drive which is relatively simple and lightweight.

It is yet another object of the present invention to provide an apparatus for latching the head in a disc drive which requires the use of only relatively small or weak spring elements.

It is a further object of the present invention to provide an apparatus for latching the head in a disc drive apparatus wherein the head is securely held in the retracted position during power-off conditions and wherein the head is surely released for movement from its retracted position during power-on conditions.

In accordance with an aspect of the present invention, in a disc drive device including a spindle motor for rotatably driving at least one disc, a head assembly having at least one head cooperating with the disc and an actuator for moving the head assembly over a predetermined range to radially position the head along the disc, and a power supply for providing operating power to the spindle motor, apparatus is provided for retracting the head to a retracted position for off-power conditions and for latching the head thereat, comprising a magnetically attractable latch element movable between a first unlatched position out of contact with the head assembly during motion thereof over the range and a second, latched position in latching contact with the head assembly, positioning the head at the retracted position. The latch element is spring urged away from the unlatched position; and an electromagnet, operable during provision of the operating power, attracts the latch element from the latched position and holds it at the unlatched position against the urging of the spring. When the power supply is interrupted, the electromagnet is deactuated to release the latch element and the actuator is energized to move the head assembly so as to position the head at the retracted position during motion of the latch element to the latched position. The latch element thereafter prevents movement of the head assembly to maintain the head at the retracted position in the absence of the operating power.

These and other objects, advantages and features of the present invention will become apparent from the following detailed description of a preferred embodiment taken in connection with the accompanying drawings, throughout which like reference numerals designate like elements and parts.

DETAILED DESCRIPTION OF THE PREFERRED EMBODIMENTS

Figure 1:
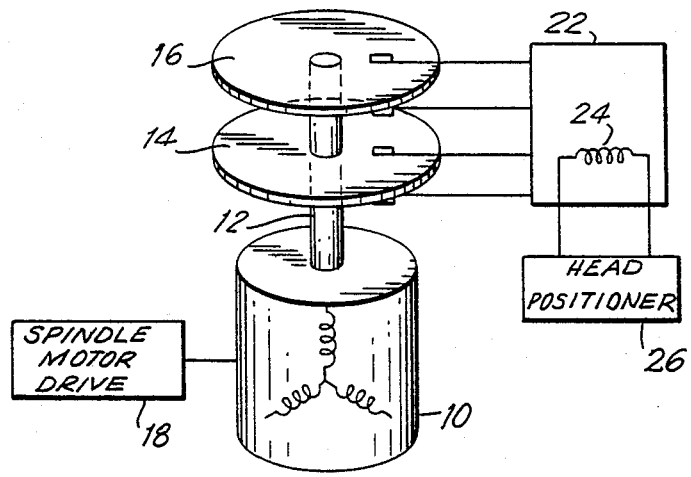
FIG. 1 is a block diagram of the basic elements comprising a hard disc drive device.

Referring now to the drawings and initially to FIG. 1 thereof, the basic elements comprising a hard disc drive system are illustrated in block diagrammatic form. It will be appreciated that while the preferred embodiments of the present invention are described in connection with a hard disc drive, the present invention is also applicable to a "floppy" disc drive in which it may be utilized to retract the head or heads and to latch the same at their power-off positions, and that the following detailed description is therefore also to be taken in connection with the "floppy" disc environment.

Figure 2:
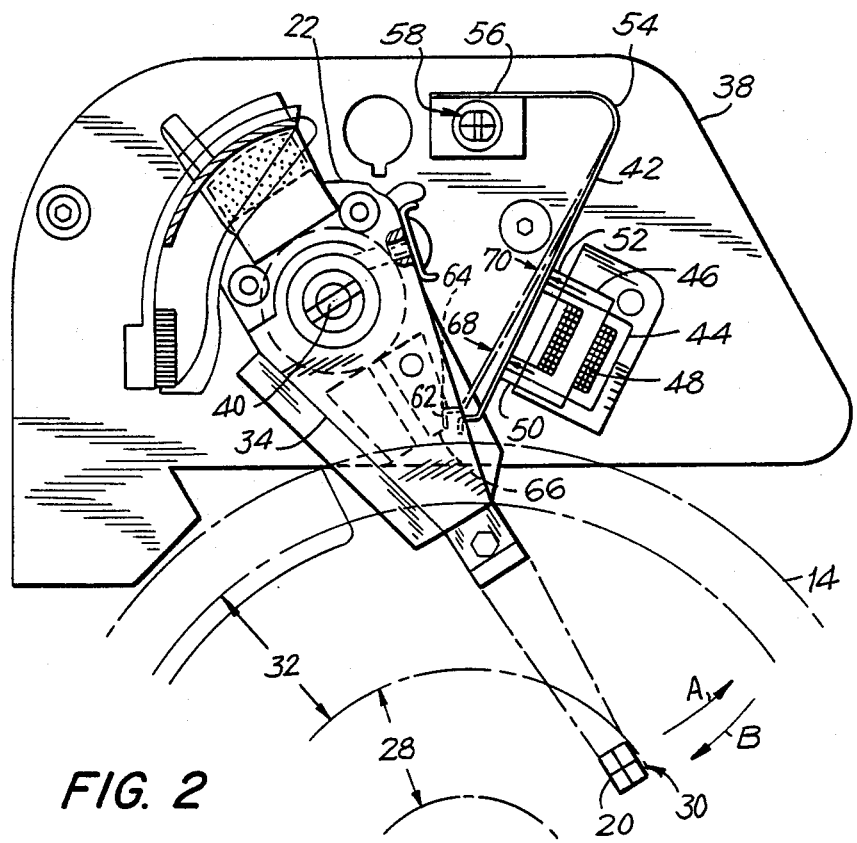
FIG. 2 is a top plan view of a first preferred embodiment of the present invention.

As shown in FIG. 1, the disc drive is comprised of a spindle motor 10, one or more hard discs 14 and 16, a spindle motor drive circuit 18, one or more heads 20, a head assembly 22 and an actuator 24 forming part of a head positioning circuit 26. Spindle motor 10 preferably comprises a DC motor having a plurality of stator windings which are individually energized under the control of motor drive circuit 18, these motor windings thus producing a force for rotatably driving a rotor, preferably a DC magnet. This rotor is mechanically coupled to a drive shaft 12 to which discs 14 and 16 are secured. Discs 14 and 16 are of identical and conventional construction and are housed in a sealed container as is typical for Winchester disc drives. As shown in FIG. 2, the conventional construction of disc 14, taken as an example, includes an annular information-free zone 28 where data is not recorded so as to provide an annulus of "home" or "park" positions 30 where a head 20 may rest during power-off conditions without damage to recorded information. In the illustrated embodiments, zone 28 is an annulus close to the center of disc 14 and information is recorded in an outer annulus 32, so that retracted position 30 is an innermost position, as shown in FIG. 2. Other conventional hard discs are constructed with information-free zone 28 in an outer annulus outside information annulus 32, so that retracted position 30 would then be an outermost position. In either case, the disc drive apparatus includes a stop means to prevent head assembly 22 from moving from retracted position 30 towards information annulus 32.

Motor drive circuit 18 may include or be controlled by a microprocessor for energizing the motor windings in a predetermined sequence to drive the motor at a predetermined, constant speed. It will be appreciated that this speed is sufficient for the air flow generated by the rotation of discs 14 and 16 to cause heads 20 to "fly" above the surfaces of discs 14, 16 at a height on the order of 50 microinches or less. Such motor drive circuits are well known in the art and provide the operating power for the disc drive from a power supply.

Heads 20 are mechanically coupled to and supported in head assembly 22 which is movable across discs 14, 16 over a predetermined area to radially position heads 20 at a desired track on discs 14, 16. In the illustrated embodiment, two discs are provided, each disc 14, 16 having two surfaces on which information may be written and read. Accordingly, four separate heads 20 are provided, each being associated and cooperating with a respective disc surface. Head assembly 22 includes a motor (not illustrated) for driving heads 20 radially along discs 14 and 16, such as a so-called moving magnet motor described in copending application Ser. No. 07/042,281, filed Apr. 24, 1987 by John Ycas et al., or the drive motor may be of the type generally referred to as a voice coil motor. Other examples of a suitable motor for driving heads 20 include a stepper motor or a linear motor formed of a coil wound about a magnetic core and being selectively energized to generate a magnetomotive force, whereby the coil is driven longitudinally with respect to that core.

Figure 3:
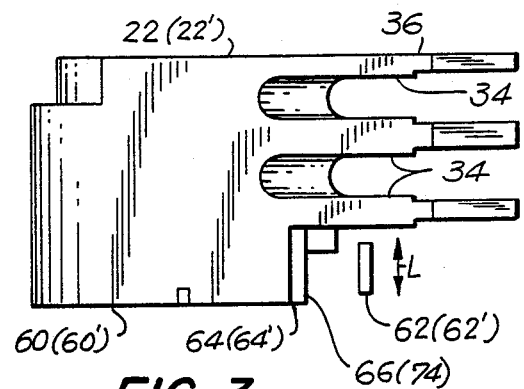
FIG. 3 is a side plan view of an actuator and head assembly for use in the present invention.

In the preferred embodiments, as illustrated more clearly in FIGS. 2 and 3, head assembly 22 is constructed as three arms 34 joined to a pivotable body, with heads 20 being mechanically secured to free ends 36 of arms 34 so as to be movable along respective radii of discs 14, 16 as arms 34 pivot. In the preferred embodiments, actuator 24 (FIG. 1) within head assembly 22 is formed as a motor coil coupled to head positioning circuit 26 for selective energization thereby. As actuator coil 24 is energized, head assembly 22 is driven to move heads 20 as a unit radially inwardly or outwardly of discs 14 and 16. In particular, actuator coil 24 may be energized by a predetermined current so as to retract heads 20 to their respective retracted positions 30. As shown in FIG. 2, the retracted positions are vertically aligned over the respective discs 14, 16. The manner in which head positioning circuit 26 operates forms no part of the present invention, although a highly advantageous apparatus including such a head positioning circuit 26 is described in detail in the above-identified U.S. Pat. No. 4,658,308. The operation of the apparatus according to the present invention in retracting head 20 to retracted position 30 and holding it there against movement due to, for example, shipment of the disc drive device, will now be described. In this discussion, reference will be made only to disc 14 and a single pivot arm 34 and head 20, but it will be understood that the description applies equally to the heads 20 cooperating with disc 16 and that all pivot arms 34 move as a unit.

Head assembly 22 is pivotally mounted on a support plate 38 by a pivot pin 40 to permit counterclockwise motion in the direction of arrow A from the illustrated retracted position 30 to selectively position head 20 over any desired track within information annulus 32. Regardless of the position of pivot arm 34 during normal operating, power-on conditions, when an interruption in the power supply occurs, for example, by turning off the power switch (not illustrated) or during a power brown-out, head assembly 22 is automatically driven clockwise in the direction of arrow B to bring head 20 to its retracted position 30. As described in the above-mentioned U.S. Pat. No. 4,658,308, an advantageous apparatus for retracting head 20 and braking spindle motor 10 utilizes the back emf generated in the windings of spindle motor 10 following interruption in the power supply. This back emf causes the appropriate current to flow through actuator coil 24 to properly position head 20 at retracted position 30 before the rotation of disk 14 slows and the air cushion on which head 20 flies is lost. This patented apparatus may advantageously be employed in the present invention, but it will be understood that the present invention may also be advantageously applied to other head assemblies and/or actuators provided the head assembly properly retracts head 20 to its retracted position 30 following an interruption in the power supply. A further description of the actuator apparatus will not be given here and reference should be had to the above-cited patent for a complete description.

In accordance with an aspect of the present invention, a novel apparatus for latching head assembly 22 where it positions head 20 at retracted position 30 includes a latch element in the form of a prong 42 which is moveable between a first unlatched position, illustrated in a solid line in FIG. 2 and at which it is out of contact with head assembly 22 over the entire range of movement of head assembly 22, and a second, latched position, illustrated in a dashed line in FIG. 2 and at which prong 42 latchingly contacts head assembly 22 and prevents movement thereof to maintain head 20 at retracted position 30 in the absence of operating power. More specifically, an electromagnet in the form of a solenoid 44 having an elongated flux carrying core 46 and a current carrying coil 48 wrapped therearound defines the unlatched position of prong 42. Solenoid 44 is continuously actuated during power-on conditions by the provision of a current through current carrying coil 48. Prong 42 is made of a magnetically attractable material, such as iron or magnetic steel and is attracted to the two exposed ends 50, 52 of core 46 when solenoid 44 is actuated. However, solenoid 44 is deactuated in response to an interruption in the power supply thereby interrupting the current flowing through coil 48, so that prong 42 is no longer held at the unlatched position. Prong 42 is urged away from the unlatched position by a bias force exerted thereon, such as by a spring 54, which in the first illustrated embodiment is comprised of a turn in prong 42 providing an angularly bent end 56 anchored to support plate 38 by anchor screw 58. Spring 54 is so constructed that prong 42 is normally spaced from exposed ends 50, 52 or core 46 by predetermined amounts, so that the action of spring 54 serves to normally urge prong 42 away from the unlatched position and towards the latched position engaging head assembly 22.

As shown in FIG. 3, head assembly 22 is so constructed that pivot arms 34 do not extend the entire vertical distance of head assembly 22, but rather a lower extending portion 60 of head assembly 22 extends a predetermined distance L below the lowest pivot arm 34 to provide a latch element receiving structure for latchingly receiving a free end 62 of prong 42 at the latched position thereof. In the embodiment illustrated in FIG. 2, free end 62 is formed as a hook which is adapted to be slidingly received in a detent 64 in lower extending portion 60. It will be recalled that suitable stop means (not illustrated) prevents head assembly 22 from moving in the direction of arrow B beyond retracted position 30. The hooked free end 62 of prong 42 latchingly contacts detent 64 so as to prevent the motion of head assembly 22 in the direction of arrow A and to thereby maintain head 20 at its retracted position 30. In the preferred embodiments, hooked free end 62 abuts detent 64 so as not to slide out, thus preventing movement of head assembly 22 in the direction of arrow A. Prong 42 is released by deactuating solenoid 44 in response to the interruption in the power supply. Lower extending portion 60 is limited in its forward extent so that prong 42 need only move a small distance between its latched and unlatched positions to enable hooked free end 62 to clear a smooth forward surface 66 of portion 60. Consequently, the spring power of spring 54 need not be very strong, enabling spring 54 and prong 42 to be relatively small and the necessary power of solenoid 44 to be correspondingly small. However, the power of solenoid 44 must still be sufficient to attract prong 42 from its latched position to its unlatched position and to hold it there against the urging of spring 54.

Prong 42 extends in the indicated direction into contact with lower extending portion 60 (referred to as the "direction" of the prong.). The direction of prong 42 and the shape of hooked free end 62 provide a strong detenting force against motion of head assembly 22 in the direction of arrow A. This direction and shape cause head assembly 22 to work against the buckling strength of prong 42; and the buckling strength of a beam (such as prong 42) is very high, compared to its bending strength. This is another reason why a small spring 54 and small prong 42 are effective in retaining head assembly 22 in its retracted position.

Although the embodiment of the present invention illustrated in FIG. 2 provides an advantageous apparatus for latching head assembly 22 with head 20 at retracted position 30 during power-off conditions, this embodiment may fail to effectively latch head assembly 22 because of the configuration of solenoid 44 and because of the configuration of spring 54. After significant use, or during assembly spring 54 or prong 42 may bend slightly, since the two ends 50, 52 of core 46 are not at equal distances from the respective closest portions 68, 70 of prong 42 and so exert different forces thereon, depending on the inverse square of the spacing. Furthermore, position 68, being farther from spring 54 than position 70 along prong 42, may react more strongly to a force from exposed end 50 than will position 70 to the same force from exposed end 52. As a result, free end 62 of prong 42 might be too far from exposed end 50 and so prong 42 may not be effectively and surely pulled into the unlatched position when power was turned on. Correspondingly, prong 42 might be released prematurely during provision of operating power if the spring force over-balances the magnetic force.

Figure 4:
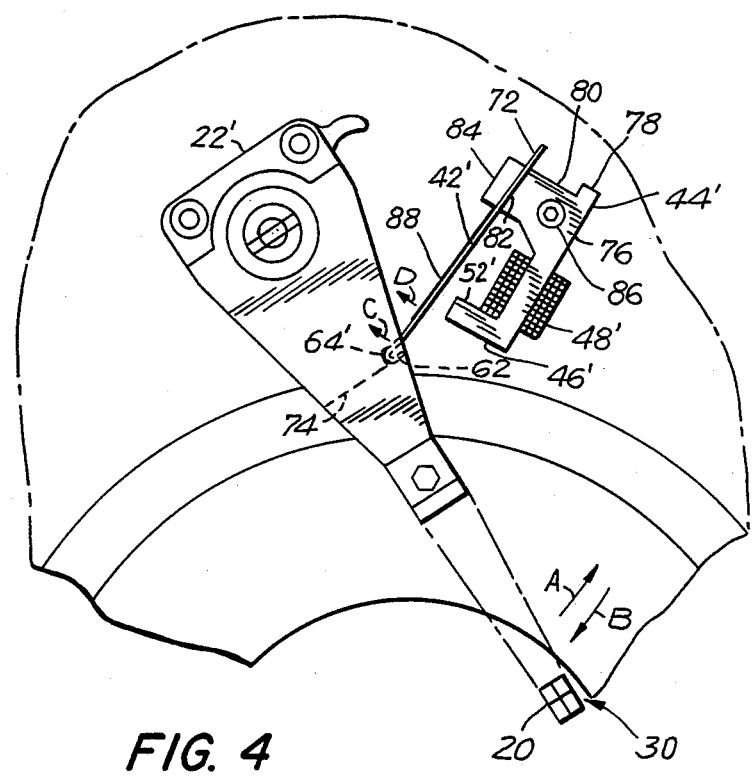
FIG. 4 is a top plan view of a second preferred embodiment of the present invention, illustrating the apparatus in a latched position during power-off conditions.
Figure 5:
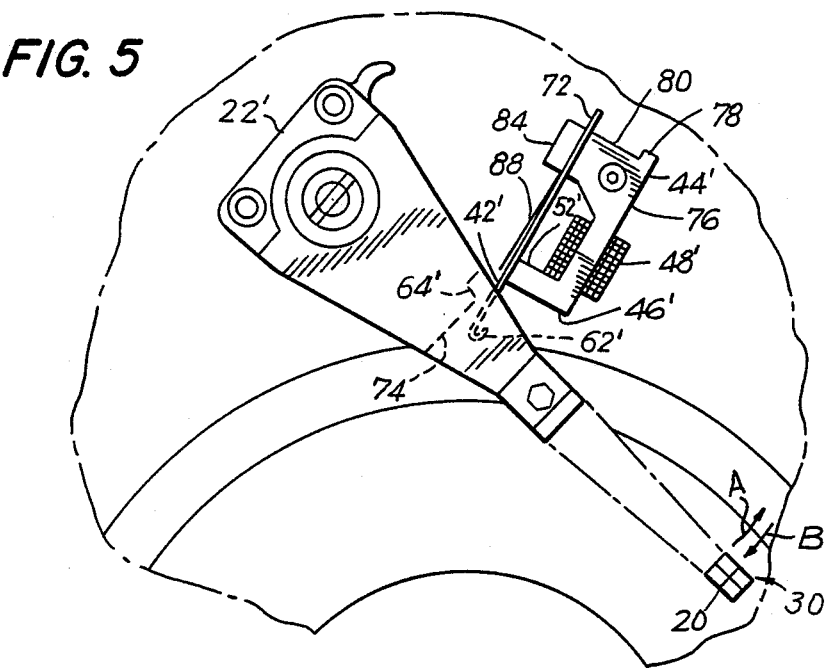
FIG. 5 is a top plan view of the embodiment of FIG. 4, illustrating the apparatus in an unlatched position during normal operating, power-on conditions.
Figure 6:
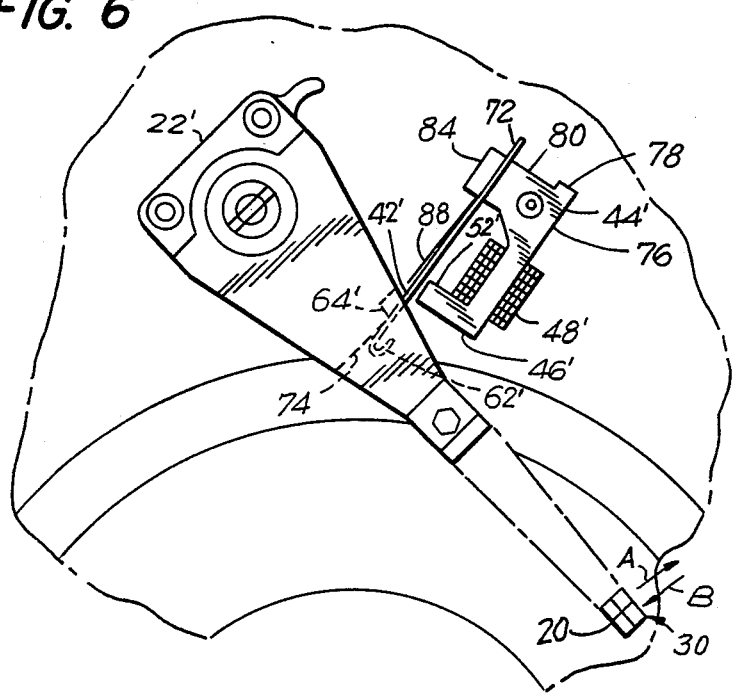
FIG. 6 is a top plan view of the embodiment of FIG. 4, illustrating the apparatus in an intermediate condition following an interruption in the power supply.

A further development of the present invention increases the magnetic force to surely overcome the spring force. The power requirements of the system are not increased, nor does any increased current interfere with the operation of heads 20 or the data recorded on disk 14. As illustrated in FIGS. 4, 5 and 6, the latch element is formed as straight prong 42' having bent end 62' adapted to latchingly contact detent 64' of head assembly 22'. As shown by comparison between FIGS. 4 and 5, in this second preferred embodiment prong 42' is attracted only to a single exposed end 52' of solenoid 44' to bring prong 42' to the unlatched position (FIG. 5) from the latched position (FIG. 4). The other end 72 of prong 42' is anchored to support plate 38 so that prong 42' is normally spaced from the one exposed end 52' in the absence of operating power (FIG. 4). Although prong 42' is illustrated as completely straight in FIG. 4, it may also advantageously be bent slightly from its free position in the direction of arrow C so as to exert a slight force in the direction of arrow D against the back edge of detent 64'.

In this second preferred embodiment, lower extending portion 60' is not a wedge-shaped extension as in the embodiment illustrated in FIG. 2, but rather is a continuous extension of head assembly 22' having a smooth forward surface 74 beyond detent 64'. Free end 62' of prong 42 is bent as shown to provide a smooth sliding surface to slide against detent 64' and forward surface 74.

Advantageously, core 46' does not have a second exposed end 52 for attracting prong 42', but rather has an exposed portion 76 including a first leg 78 adapted to direct the flux within core 46 and a second leg 80 having an abutting surface 82 against which second end 72 of prong 42' is directly anchored. A second anchor 84 is mounted on support 38 so as to securely press second end 72 of prong 42' against surface 82 and anchor it there. A screw 86 passed through leg 80 attaches solenoid 44' to the plate 38.

Thus, leg 80 of core 46' anchors both prong 42' and solenoid 44' and directs prong 42' away from its unlatched position. This provides a distinct advantage in the assembly of the disk drive device and in ensuring its continued appropriate operation. Specifically, solenoid 44 in the first preferred embodiment of FIG. 2 may vary slightly in its position on plate 38. It has been found that variations to within 1/1,000 inch in the position of solenoid 44 relative to prong 42 may create relatively large differences in the magnetic force needed to bring prong 42 to the unlatched position. Furthermore, it was undesirable to have exposed end 50 of core 46 too close to disc 14 near free end 62 of prong 42, since then the magnetic flux might damage head 20 or disc 14.

In the embodiment of FIGS. 4–6, on the other hand, solenoid 44' is assembled with a one-piece armature which can be manufactured within great tolerances to the same size. It can then be attached to plate 38 at a single, predetermined position relative to the pivot point of prong 42' acting as a spring. This means that exposed end 52' of core 46' will always be in exactly the same spaced relationship relative to free end 62' of prong 42', so that the magnetic force and bias force will always be the same for each disk drive device and can be precisely and reliably manufactured.

The operation of the second preferred embodiment is as follows. During power-off conditions, prong 42' is at its latched position with its free end 62' latchingly contacting detent 64' to prevent motion of head assembly 22' in the direction of arrow A. When power is turned on, current flows through coil 48' and exposed end 52' of core 46' magnetically attracts prong 42' from the latched position illustrated in FIG. 4 to the unlatched position illustrated in FIG. 5. Solenoid 44' holds prong 42' at the unlatched position during power-on conditions as head assembly 22' pivots around pin 40 to radially position head 20 at any desired track within information annulus 32. FIG. 5 illustrates head assembly 22' at an intermediate position away from retracted position 30.

Advantageously, power can be applied to coil 48' in a time cycle such that a high current is provided for such a time as may be needed to move prong 42' into contact with exposed end 52'. This current can, temporarily, be made quite high to ensure pulling prong 42' into the unlatched position. Current can then be reduced to a significantly lower level which, nevertheless, will result in an adequate magnetic force produced by exposed end 52' to overcome the bias force and hold prong 42' in the unlatched position. This low current level is then maintained for the remaining duration of the power-on state. Ability to use this low power level is advantageous in that heat generation in the disk drive enclosure is minimized, deterioration of coil 48' due to excessive internal heat is slowed, and overall power consumption of the disk drive is reduced.

Upon an interruption of the power supply, head assembly 22' is at some position within its range of movement, for example, the intermediate position illustrated in FIG. 5. Solenoid 44' is deactuated in response to the interruption in the power supply and end 52' releases prong 42' which thereafter begins to move away from the unlatched position under the spring bias force generated at leg 80 anchoring second end 72 of prong 42'. If head assembly 22' were already in retracted position 30 illustrated in FIG. 4, prong 42' would simply move in the direction of arrow D until free end 62' fits within detent 64' at the latched position. However, if head assembly 22' is still at an intermediate position as illustrated in FIG. 6 and is in the process of moving towards retracted position 30, free end 62' will contact the front sliding surface 74 of lower extending portion 60' and will slide therealong as head assembly 22' moves in the clockwise direction, until free end 62' drops into detent 64'. Because the spring power of prong 42' is small, the frictional force of free end 62' on sliding surface 74 is small and the retardation of head assembly 22' thereby is minimal. Consequently, a greater tolerance in the range of back emf is permitted, and this increases the reliability of the latching operation. Thus, head 20 is positioned by movement of head assembly 22' to the retracted position during the motion of prong 42' to its latched position, prong 42' thereafter preventing movement of head assembly 22' to maintain head 20 at retracted position 30 in the absence of operating power.

Advantageously, a second prong formed as a metal strip 88 is also anchored by leg 80 and second anchor 84 and extends parallel to prong 42' up to a point facing exposed end 52'. Strip 88 serves to concentrate the magnetic flux and hence the magnetic force between prong 42' and exposed end 52'. The length of strip 88 is advantageously less than the length of prong 42' both to avoid the concentration of magnetic flux at free end 62', where it is unnecessary and might cause bending of prong 42', and to avoid any contact between strip 88 and head assembly 22'. Since strip 88 is not connected or fastened to prong 42' in any way, past the anchor point (between leg 80 and anchor 84), the extra stiffness that strip 88 would otherwise add to prong 42' does not inhibit the ability of the magnetic force from exposed end 52' to pull prong 42' into the unlatched position.

The above description has been given on two preferred embodiments of the present invention and it will be readily apparent to one skilled in the art that many changes and modifications may be made therein without departing from the spirit and the scope of the present invention. Therefore, scope of the present invention should be determined from the appended claims.

I claim:

1. In a disk drive device including a moveable head assembly having at least one head moveable over a predetermined range to position said head along a disc and further moveable in response to an off-power condition to retract said head, apparatus for latching said head at a retracted position for said off-power conditions, comprising:

a magnetically attractable latch element movable between a first, unlatched position out of contact with said head assembly during motion of the latter over said range and a second, latched position in latching contact with said head assembly for latching said head at said retracted position;

electromagnet means including a solenoid which is substantially continuously actuated during power-on conditions and a elongated flux carrying core, said core including both bias means for urging said latch element away from said unlatched position and anchoring means for anchoring both said solenoid and said latch element; said electromagnet means being energized during power-on conditions for attracting said latch element from said latched position and for holding the same at said unlatched position against the urging of said bias means; and means responsive to an off-power condition for deactuating said electromagnet means to release said latch element;

whereby when said head assembly moves to retract said head, said latch element moves to said latched position and thereafter prevents movement of said head assembly to maintain said head at said retracted position during off-power conditions.

2. Apparatus according to claim 1, wherein said head assembly includes a pivot arm having said head mounted at a free end thereof for pivotally positioning said head along said disc.

3. Apparatus according to claim 2, wherein said pivot arm includes latch element receiving means for receiving said latch element at said latched position.

4. Apparatus according to claim 3, wherein said latch element is formed as an elongate prong and said latch element receiving means includes a detent adapted to receive one end of said prong.

5. Apparatus according to claim 4, wherein said one end of said prong is angularly bent to provide a smooth sliding surface.

6. Apparatus according to claim 1, wherein said head assembly includes a sliding surface adapted to slidingly receive said latch element during movement from said unlatched position to said latched position.

7. Apparatus according to claim 1, further comprising a spindle motor having plural motor windings, and switch means responsive to an interruption in power for supplying an emf generated by said motor to drive said head assembly so as to retract said head toward said retracted position.

8. Apparatus according to claim 1, wherein said solenoid has a current-carrying coil wrapped therearound and has at least one exposed end for attracting said latch element to said unlatched position when said solenoid is actuated.

9. Apparatus according to claim 8, further comprising flux-concentrating means for increasing an attractive force from said at least one exposed end of said core on said latch element.

10. Apparatus according to claim 8, wherein said latch element is formed as a substantially straight metal prong having a free end for contacting said head assembly and a second end, and wherein said anchoring means secures said second end so that said prong is normally spaced from said at least one exposed end of said core when said solenoid is not actuated.

11. Apparatus according to claim 10, wherein only one exposed end of said core attracts said prong to said unlatched position.

12. Apparatus according to claim 11, further comprising a support plate upon which said head assembly, said prong and said solenoid are mounted, and wherein said core has a second end mounted at a predetermined position on said plate and said anchoring means anchors said second end of said prong directly against said second end of said core, whereby said prong is normally spaced from said one exposed end of said core by a predetermined amount.

13. Apparatus according to claim 10, further comprising a metal strip aligned with and abutting said prong for increasing a magnetic force from said exposed end of said core on said prong.

14. Apparatus according to claim 13, wherein said anchoring means also anchors said metal strip.

15. Apparatus according to claim 8, wherein said solenoid is supplied with an energizing current of higher magnitude when the solenoid is actuated initially to attract said latch element to said unlatched position, and of lower magnitude to maintain said latch element at said unlatched position.

* * * * *